Feb. 3, 1970 R. W. SANDERSON ET AL 3,493,645
PROCESS FOR MANUFACTURING SEALS
Filed Sept. 29, 1967 2 Sheets-Sheet 1

ROBERT W. SANDERSON
RALPH P. SCHMUCKAL
INVENTORS

BY John R. Faulkner
Glenn S. Arendsen
ATTORNEYS

ROBERT W. SANDERSON
RALPH P. SCHMUCKAL
INVENTORS

United States Patent Office 3,493,645
Patented Feb. 3, 1970

3,493,645
PROCESS FOR MANUFACTURING SEALS
Robert W. Sanderson, Birmingham, and Ralph P. Schmuckal, Saline, Mich., assignors to Ford Motor Company, Dearborn, Mich., a corporation of Delaware
Filed Sept. 29, 1967, Ser. No. 671,673
Int. Cl. B29h 9/11
U.S. Cl. 264—161                        13 Claims

ABSTRACT OF THE DISCLOSURE

A disc of the material desired in the body of a shaft seal is placed on top of a mold core pin and is surrounded by a ring of the material desired at the seal face. As the mold is closed, the material of the ring extrudes over a lip on the core pin and into the seal face portion of the mold cavity. Further closing of the mold extrudes the body material into the remaining portion of the mold cavity.

SUMMARY OF THE INVENTION

The increased performance required of automatic transmissions and engines has necessitated the use of seal materials having higher heat resistance, lower friction, and better wear properties. Materials capable of providing such properties are available commercially, but making shaft seals entirely of these materials is prohibitively expensive. Multiple material seals comprising an expensive material at the seal face backed by a less expensive base material have been proposed to alleviate material costs. Much of the material savings provided by the multiple material seals, however, has been lost to the increased processing required to manufacture the seal.

Virtually all molded shaft seals are made presently by extruding excess sealing material into a seal cavity and subsequently trimming the seal on an angle across the seal face to form the seal lip of the desired dimension. Multiple material seals have been made by the additional step of coating a molded base material with a premium material or by a double molding operation in which the base material is molded over a previously formed face of the premium material.

This invention provides a process for molding multiple material seals in a single molding operation. A disc-shaped preform of the material desired in the seal body is placed on top of a core pin that has a groove around its upper end corresponding to the seal face. An annular preform of the material desired at the seal face is placed on top of the core pin circumferentially around the body material. Closing movement of the mold first extrudes the annular preform into the mold cavity with the material following the contours of the mold walls and concentrating in the point of the core pin groove. As the mold continues to close, the material of the disc preform extrudes into the remaining portion of the cavity to form the seal body. Resulting is a seal having the material of the annular preform at the seal face and seal lip and the material of the disc preform in the seal body.

Usually the material for the seal face is a premium material selected for its excellent frictional properties, good heat resistance and heat transfer, good wear resistance, and good life in an oil and grease environment. Typical premium materials are polyfluorocarbons sold under the trademarks Viton and Teflon, silicone and fluorosilicone rubbers, etc. The base material usually is any inexpensive material capable of surviving in its intended environment and having good bonding properties to the metal case and the premium material. Typical are blends of Hydrin, a material based on epichlorohydrin, polyacrylate, butadiene rubbers, chloroprene rubbers, nitrile-butadiene rubbers, nitrile-chloroprene rubbers, styrene-butadiene rubbers, etc.

Some of the material in the annular preform tends to follow the outer contours of the mold cavity, which results in a seal having the premium material at both the face and the outer side of the seal. While this is desirable in some cases, usually the premium material at the outer side of the seal performs no useful function, and it is more economical to concentrate all the premium material at the seal face. This can be done by stacking a second disc of base material above the disc and annular preforms on top of the core pin. Closing the mold then concentrates the material of the annular preform at the seal face, locates some of the material of the upper disc at the outer side of the seal and locates the remaining material of the upper disc and the material of the lower disc in the body of the seal.

DETAILED DESCRIPTION

Figure 1:
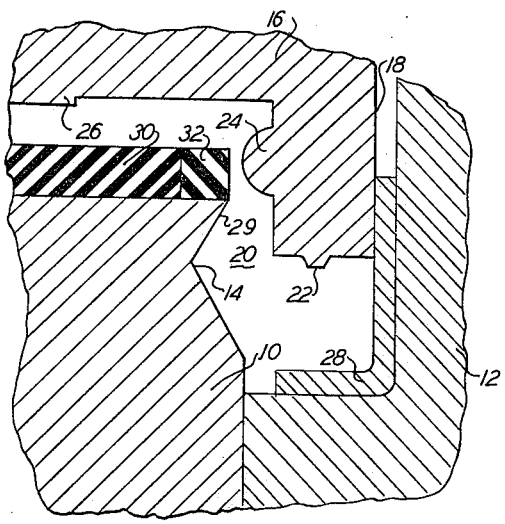
FIGURE 1 is a cross-sectional elevation of an open mold showing two material preforms in place on top of the core pin.

Referring to FIGURE 1, a mold core pin 10 is mounted in a stationary mold housing 12. Core pin 10 has a groove 14 surrounding its upper end that corresponds to the desired shape of the seal lip. A movable mold die 16 is positioned above the top of core pin 10. Die 16 has a depending skirt 18 slightly larger than the diameter of core pin 10, and skirt 18 combines with core pin 10 to define the mold cavity 20.

A downwardly projecting ridge 22 is formed at the bottom of skirt 18 and an inwardly projecting semicircle 24 is formed on the skirt interior where it projects into mold cavity 20. A shallow boss 26 is formed on the central portion of die 16.

During the molding operation, the core pin 10, housing 12, and die 16 are heated to about 300° F. The metal case 28 of the resulting seal first is located in the mold housing 12. Then a disc preform 30 of the material for the seal body is located on top of core pin 10 and an annular preform 32 of the material for the seal face is located radially outside disc 30.

Figure 2:
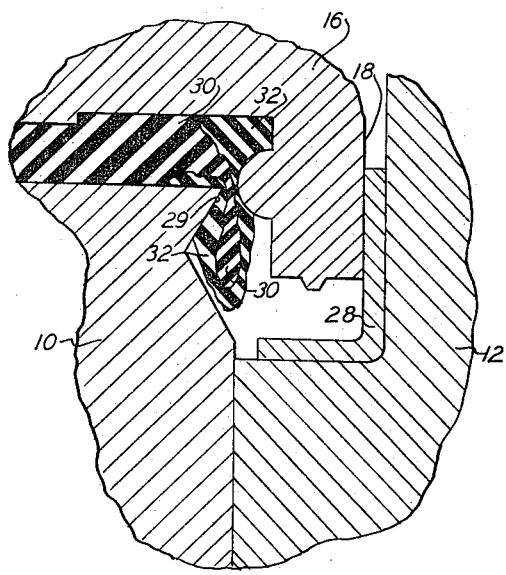
FIGURE 2 shows the materials of FIGURE 1 being forced into the mold cavity and FIGURE 3 shows the final cross-sectional shape of the seal resulting from completed mold closing.
Figure 3:
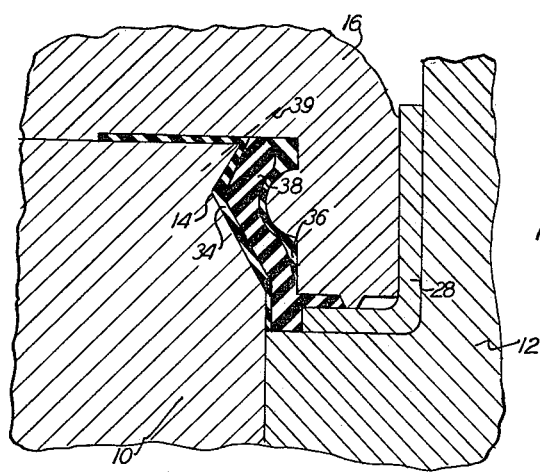

Die 16 is moved slowly toward core pin 10 and when boss 26 contacts preform 30 the material of reform 32 begins extruding over lip 29 into mold cavity 20 with part of the premium material following the contour of groove 14 in the core pin and part following the contour of skirt 18 as shown in FIGURE 2. Continued closing of die 16 extrudes the base material into the main portion of mold cavity 20, with the base material eventually contacting case 28. As shown in FIGURE 3, the resulting seal has a seal face 34 and a part of the seal back 36 made of the material of preform 32 with the main body 38 made of the material of preform 30. After curing, the mold is opened and the seal is removed. The seal then is trimmed approximately along dotted line 39 and a garter spring is installed in the channel formed by semicircle 24.

Figure 4:
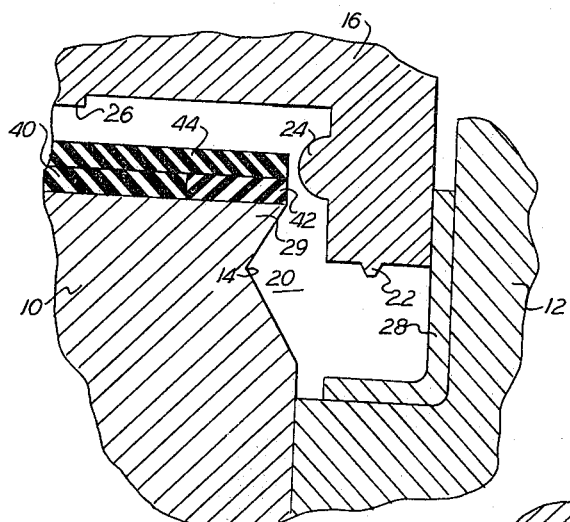
FIGURE 4 is similar to FIGURE 1 except it shows a material preform arrangement that concentrates essentially all of the premium material at the seal face.
Figure 5:
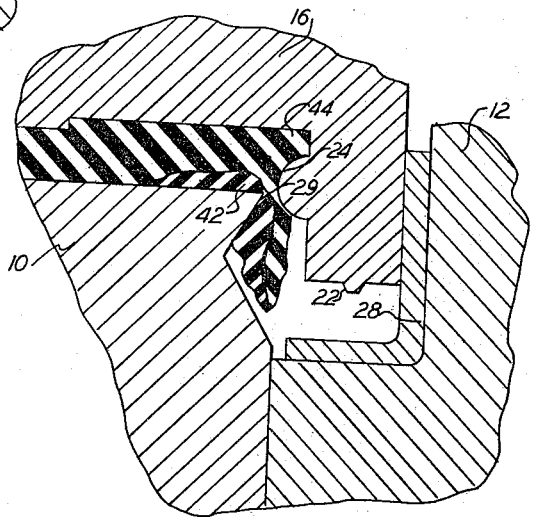
FIGURE 5 shows the materials of FIGURE 4 being forced into the mold cavity and FIGURE 6 shows the seal cross-section resulting from completely closing the mold on the FIGURE 4 arrangement.
Figure 6:
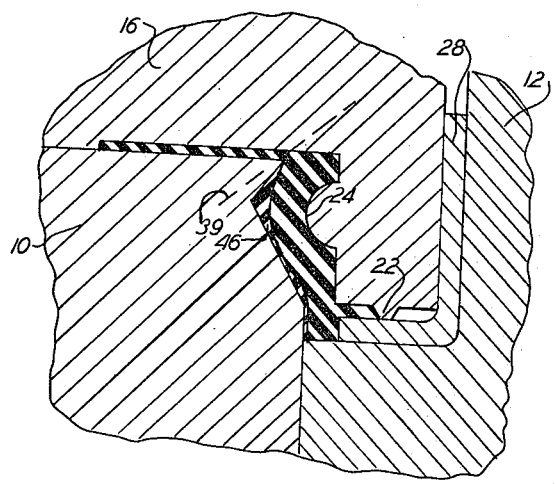

FIGURES 4–6 use the FIGURE 1 mold construction to produce a seal having all of the material of the annular preform concentrated at the seal face. A disc preform 40 is located on top of core pin 10 and is surrounded by an annular preform 42 with both preforms topped by another disc preform 44. As die 16 moves into contact with preform 44, the materials of preforms 42 and 44 begin extruding into the mold cavity 20 (see FIGURE 5). The material of preform 42 follows the contour of core pin 10 into the groove 14, while the material of preform 44 follows the contour of skirt 18. Continued movement of die 16 forces the remaining material of preforms 40 and 44 into the main portion of the mold cavity 20 and into contact with seal case 28. The resulting seal shown in FIGURE 6 has a face 46 of the material of preform 42 with a considerable portion of the material concentrated at the point of groove 14. The material of preforms 40 and 44 make up the remainder of the seal.

Good knitting usually results between the materials of the seal face and the seal body during the mold closing and curing operations. For materials having reduced adhesion or knitting to each other, the preforms are made of blends of the materials. Thus, the blend preform 32 can consist of about 80 percent by weight premium material and 20 percent body material while the blend in preform 30 consists of 20 percent premium material and 80 percent body material. Other blends can be used if desired.

The preforms shown in FIGURE 1 can be made by slicing discs from a solid, dual material extrusion having the premium material forming the outer wall. A similar method can be used to make the lower level of preforms in FIGURE 4, with a disc of solid material added to complete the material package.

In an actual process for molding seals 2″ in diameter, preforms 30 and 32 are 1/16 inch thick and the radial width of preform 32 is about 1/4 inch. Boss 26 is one inch in diameter and 1/64 inch high. The mold closes at a rate of about 1/4 inch per minute. Preform 32 weighs about 2.7 grams and preform 30 weighs about 3.6 grams so the premium material constitutes over 40 percent of the mold charge. Virtually all of the flash is the inexpensive material of preform 30 however, and the final seal contains about 60–70 percent premium material. The performance of the seal essentially equals the performance of a seal made entirely of premium material although its material costs are approximately 1/3 as much. When using the process of FIGURE 4, preform 42 is about 1.2 grams and preform 40 and 44 total about 4.6 grams. Premium material then makes up about 20 percent of the mold charge and about 30 percent of the final seal.

Instead of locating the preforms on the top of the core pin, the mold assembly can be inverted and the preforms located in the cavity of die 16. The equivalent of boss 26 can be located on top of the core pin or a smoothly sloped projection can be located on either the core pin or the die. Seals comprising three materials can be made by using a third material as preform 44; the resulting seal has a face of the material of preform 42, a core of the material of preform 40, and a back of the material of preform 44. With proper selection of preform sizes, seals made by the process of FIGURES 1–3 can have a core of the material of preform 30 completely surrounded by the material of preform 32.

Thus this invention provides a process for molding a multiple material shaft seal in a single molding operation. The process requires considerably less time and effort than previous processes for making multiple material seals, and produces seals providing considerable benefits in life and material savings. A major advantage of the process lies in the fact that the flash resulting from the molding operation is almost entirely inexpensive material from preforms 30, 40 or 44; by properly proportioning the sizes of the preforms, only premium material fills the mold cavity, and the base material makes up almost all of the flash.

What is claimed is:

1. A process for forming a multiple material seal having the seal lip made up of one material and the seal body made up primarily of the other material, said process being carried out in a mold having a core pin and a die member, said die member being movable toward and away from one end of said core pin, said process comprising forming a groove around the core pin, the shape of said groove substantially corresponding to at least the lip of the seal face, said groove defining at least a portion of the mold cavity, positioning said core pin in said mold so the core pin defines an inner portion of the mold cavity, placing preforms of seal materials on the top of the core pin with the preform of the material desired at the lip of the seal face on the outer periphery of the core pin and the preform of the material desired in the seal body being surrounded by the outermost preform and moving the die member toward the core pin to force the seal materials into the mold cavity so the outermost preform flows along the core pin wall and the groove therein as well as the outer wall of the mold cavity and the innermost preform flows within the lined cavity to be partially encased thereby and to fill the mold cavity.

2. The process of claim 1 in which the preform of the seal material desired at the lip of the seal face is an annular ring and the preform of the seal material desired in the seal body is a disc, said disc being surrounded by said ring.

3. The process of claim 2 in which the disc preform comprises a blend of the material desired at the seal face with the material desired in the seal body.

4. The process of claim 3 in which the annular preform comprises a blend of the material desired in the seal body with the material desired in the seal face.

5. The process of claim 4 in which the mold die initially contacts the center portion of the preforms when the mold is closing.

6. A process for molding a multiple material seal, said process being carried out in a mold having a core member and a die member, said die member being movable toward and away from one end of said core member, said process comprising forming a groove around said end of the core member, said groove substantially corresponding to the shape of the lip of the seal face, said groove defining at least a portion of the mold cavity, locating said core member within the mold so the core member defines an inner portion of the mold cavity, placing material preforms between the core member and the die member with a first preform of the material desired at the lip of the seal face located radially outward of a second preform of the material desired in the seal body and a third preform of the material desired in the seal body located on top of the two previously mentioned preforms, and moving the die member toward the end of the core member at a controlled rate to force the materials into the mold cavity, the material of the first preform desired at the lip of the seal face flowing along the core pin wall into the deep portion of the groove and thereby forming the seal lip, and the material of the second and third preforms flowing into the mold cavity behind the material of the seal lip.

7. The process of claim 6 in which the preforms are located on the end of the core member with the preform of the material desired at the seal face being an annular ring and the preform of the material desired in the seal body being a disc, said ring preform surrounding said disc preform.

8. The process of claim 7 in which each preform comprises a blend of a base material and a premium material.

9. A process for molding a shaft seal comprising forming a groove around the upper end of a mold core pin, said groove substantially corresponding to the shape of the seal face, locating said core pin within a movable mold die so the core pin defines the inner surface of a mold cavity, placing material preforms of different materials between the upper end of the core pin and the corresponding mold die with the preform of the material desired in the seal face located radially outward of the other preform, and closing the mold at a controlled rate to force the materials into the mold cavity, so at least a portion of the material from the outer preform flows along the core pin wall and the groove with some of the material from the outer preform concentrating in the groove to form the seal face, a portion of the material from the outer preform also flowing along the outer wall of the mold cavity, and the material of the inner preform flows into the mold cavity behind said portion of the material from the outer preform concentrated in said groove to fill the mold cavity.

10. The process of claim 9 comprising trimming flash from the resulting seal along a line located away from the seal lip, said seal lip being suitable for use in the molded condition.

11. The process of claim 2 comprising placing a third preform on top of the aforementioned preforms, the material of said third preform moving into the body portion of the seal when the mold is closed.

12. The process of claim 1 comprising trimming flash from the resulting seal along a line located away from the seal lip, said seal lip being suitable for use in the molded condition.

13. The process of claim 6 comprising trimming flash from the resulting seal along a line located away from the seal lip, said seal lip being suitable for use in the molded condition.

References Cited

UNITED STATES PATENTS

| | | | |
|---|---|---|---|
| 1,535,715 | 4/1925 | Canfield | 264—260 |
| 2,982,999 | 5/1961 | Stewart | 264—267 |
| 1,354,734 | 10/1920 | Ferguson | 264—260 |
| 3,090,996 | 5/1963 | Reichenbach et al. | 264—267 |
| 3,063,097 | 11/1962 | Jutzi. | |

ROBERT F. WHITE, Primary Examiner

RICHARD SHEAR, Assistant Examiner

U.S. Cl. X.R.

264—248, 260, 268